Sept. 29, 1959   M. E. OAKES ET AL   2,906,524
CONSTANT FORCE MECHANISM
Filed Aug. 11, 1958
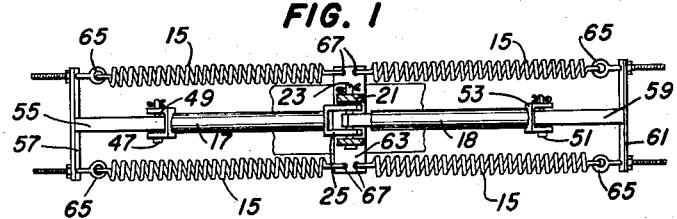
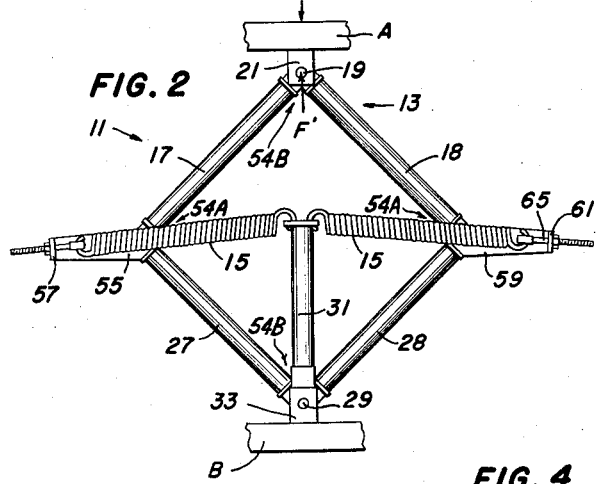
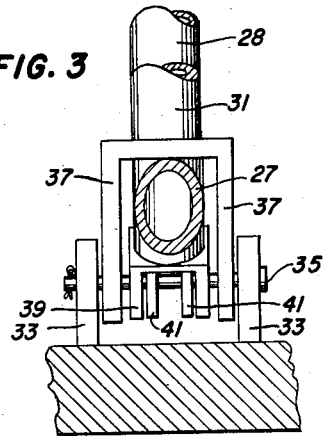
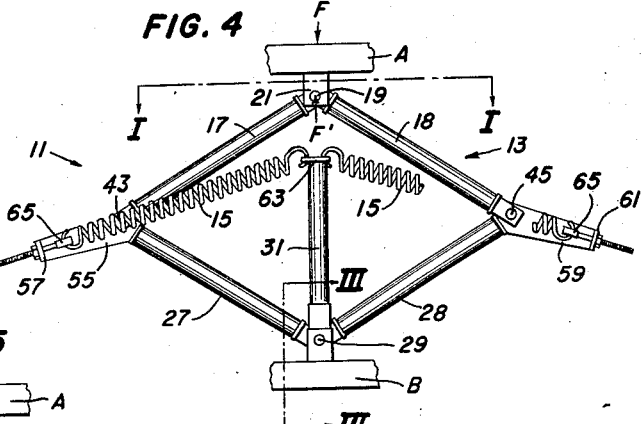
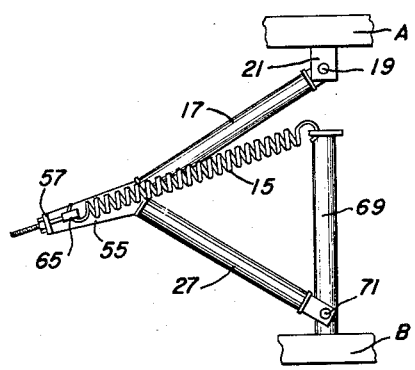
INVENTORS.
MARVIN E. OAKES
BY KERMIT L. RACELY
John R. Walker, III
Attorney United States Patent Office 2,906,524
Patented Sept. 29, 1959

2,906,524

CONSTANT FORCE MECHANISM

Marvin E. Oakes and Kermit L. Racely, Memphis, Tenn., assignors to Dover Corporation, Washington, D.C.

Application August 11, 1958, Serial No. 754,356

7 Claims. (Cl. 267—1)

This invention relates to a compressible mechanism having a substantially constant counterforce output. The present application is a continuation-in-part of our co-pending application for patent Serial No. 694,265, filed November 4, 1957.

In general, the constant force mechanism of the present invention may be employed in substantially any place in lieu of counterweights, springs, or the like where it is desired to have a substantially constant output against the force exerted thereon, regardless of the amount of said exerted force. The present invention possesses advantages over the use of counterweights since it is much lighter and more compact than bulky counterweights. Also, in many applications, the present invention would possess advantages over the use of conventional springs, which, as is well known, do not have a constant counterforce output; but, instead, the output of a spring varies as it is displaced from its "at-rest" position. Thus, as a coiled helical compression spring is compressed, the counterforce exerted by the spring increases.

An example of the improved results obtainable with the constant force mechanism of the present invention is illustrated in our said co-pending application, in which one form of said mechanism is used as a counterbalancing means for a pivoted loading dock platform. Regardless of the position of the loading dock platform, the counter-balancing force of the mechanism is substantially the same, whereas, if compression springs were used in place of said mechanism, the upward counterforce would be greater as the platform was lowered. Also, it will be understood that if counterbalancing weights were used the weights would be quite large and bulky, which would be costly to ship to the place of installation and create problems in the installation thereof.

One of the principal objects of the present invention is to provide a compressible mechanism which has a substantially constant counterforce output.

A further object is to provide a useful, compact, and convenient device to take the place of counterweights, springs, or the like in many applications.

A further object is generally to improve the design and construction of constant force mechanisms.

The means by which the foregoing and other objects of the present invention are accomplished and the manner of their accomplishment will be readily understood from the following specification upon reference to the accompanying drawings, in which:

Fig. 1 is a sectional view of the constant force mechanism of the present invention taken as on the line I—I of Fig. 4.

Fig. 2 is a side elevational view of the mechanism shown in an upward or extended position.

Fig. 3 is a fragmentary sectional view taken as on the line III—III of Fig. 4.

Fig. 4 is a view similar to Fig. 2, but showing the device in a lowered or compressed position and with a portion of the springs being broken away for purposes of illustration.

Fig. 5 is a modified form of the present invention.

Referring now to the drawings in which the various parts are indicated by reference characters, the constant force mechanism 11 of the present invention comprises, in general, a diamond-like structure indicated by the numeral 13 and resilient means as two pairs of tension springs 15 for urging the diamond-like structure towards an extended disposition.

In the following description, reference will be made to "upper" and "lower" in referring to certain parts for the sake of clarity, but it will be understood that it should not be so limited since the position of the device may be changed from that shown in the drawings without departing from the spirit and scope of the present invention. Thus, for example, the whole device may be turned upside down or sidewise from that shown in the drawings without affecting the operation of the device.

Diamond-like structure 13 includes a first or upper pair of rigid arms 17, 18 respectively pivotally connected adjacent the inner or upper ends thereof to each other at pivot point 19 and adapted to be pivotally connected to a first member or object A at this same pivot point. It will be understood that object A is any object with which it is desired to use the present invention. Structurally, this connection of upper arms 17, 18 and object A is preferably by a bracket 21 fixedly mounted on object A and a pin 23 extending through aligned apertures in upper arms 17, 18 and bracket 21. Upper arm 17 is preferably forked as at 25 with the upper end of upper arm 18 being disposed between the forked portion 25. The other part of diamond-like structure 13 is formed by a second or lower pair of rigid arms 27, 28. The inner or lower ends of lower arms 27, 28 are pivotally connected to each other, as at pivot point 29, and adapted to be pivotally connected to a second member or object B at this pivot point. Also, at pivot point 29 the lower end of a supporting means or post 31 is connected and pivotal relative to object B and lower arms 27, 28. This pivotal connection of lower arms 27, 28, object B, and post 31 is preferably, though not necessarily, by means of a pair of upstanding and spaced pieces 33 fixedly mounted on object B and a pin 35 extending through aligned apertures in the lower ends of lower arms 27, 28, post 31, and pieces 33. Structurally, the lower end of post 31 is preferably forked as at 37, which forked portion is disposed on pin 35 between pieces 33; the lower end of lower arm 27 is forked as at 39 and is disposed on pin 35 between the forked portion 37; and the lower end of lower arm 28 is preferably forked as at 41 and is disposed on pin 35 between the forked portions of arm 27.

The outer or upper ends of lower arms 27, 28 are pivotally connected to the lower ends of upper arms 17, 18 as at pivot points 43, 45. The pivotal connection at pivot point 43 is preferably by means of a pin 47 extending through aligned apertures in arm 27 and through a forked portion 49 of upper arm 17, which forked portion straddles the arm 17. Similarly, the pivotal connection at pivot point 45 is preferably by means of a pin 51 extending through aligned apertures in arm 28 and through a forked portion 53 of arm 18, which forked portion straddles arm 18.

From the foregoing, it will be understood that diamond-like structure 13 has four sides, i.e., arms 17, 18, 27, and 28, and four corners, i.e., the side or outer corners 54A adjacent pivot points 43, 45, and upper and lower or inner corners 54B adjacent pivot points 19, 29.

Lower arm 27 projects beyond pivot point 43 for a substantial distance to form a rigid extension 55 of the arm. Extension 55, as viewed from the side as in Fig. 2, extends at an angle relative to the main body of the arm and projects substantially outwardly or to the left as viewed in this figure. Extension 55 includes a transverse member 57 projecting laterally to either side of the main body extension 55, as best seen in Fig. 1.

Lower arm 28 projects beyond pivot point 45 for a substantial distance to form a rigid extension 59 of the arm similar to extension 55. Extension 59, as viewed from the side as in Fig. 2, extends at an angle relative to the main body of the arm and projects substantially outwardly or to the right as viewed in this figure. Extension 59 includes a transverse member 61 projecting laterally to either side of the main body of extension 59, as best seen in Fig. 1.

Post 31 preferably includes a transverse piece 63 disposed adjacent the upper end of the main body of the post. One pair of tension springs 15 extend between post 31 and extension 55, and the other pair of springs 15 extend between the post and extension 59. One end of each of springs 15 is mounted from its related extension 55, 59 as by means of eye bolts 65 or the like and the other end of each of the springs is mounted from transverse piece 63 of post 31 as by means of the end of the springs extending through apertures 67 in the transverse piece. Springs 15 are preferably disposed as best shown in Fig. 1, wherein it will be seen one of each pair of the springs is disposed on one side of mechanism 11 and the other of each pair is disposed on the opposite side thereof.

Mechanism 11 is preferably symmetrically arranged, with the lengths of arms 17, 18, 27, and 28 between the pivot points at the opposite ends thereof being preferably the same and with springs 15 being substantially the same length and substantially the same size. Thus, the pair of springs 15 to the right as viewed in Fig. 1 exert an opposite pull against the other pair of springs 15 to the left in this figure so that post 31 will be held in a substantially central position of the device, i.e., in line between pivot points 19 and 29. Thus, as viewed in Fig. 2, if object A were displaced to the right or left, as viewed in this figure, and object B held stationary, springs 15 would cause post 31 to follow the movements thereof and remain in line with pivot points 19, 29.

In the operation of mechanism 11, either object A or object B may be held stationary and the other object pressed in a direction towards the stationary one to cause the mechanism to compress. Or, if desired, both objects A and B may be movable and may be caused to move towards one another to squeeze mechanism 11 towards a compressed disposition. However, for purposes of illustration, it will be assumed that object B is stationary and an outside force is exerted downwardly on object A, which force is illustrated diagrammatically by the downwardly-extending arrow at F in Figs. 2 and 4. It should be pointed out that object A and object B may be two separate independent objects or may be two parts of one overall object, depending upon the application of the mechanism of the present invention.

It will be understood that springs 15 exert a counterforce in a direction to urge the opposite side corners 54A of mechanism 11 inwardly toward post 31, whereby exerting an upward counterforce at pivot point 19, illustrated diagrammatically by the upwardly-extending arrow at F' in Figs. 2 and 4. With mechanism 11 in an upward or extended position best shown in Fig. 2, if the applied outside force F is greater than counterforce F' mechanism 11 will be compressed towards a downward or compressed disposition best shown in Fig. 4. As mechanism 11 is compressed, it will be understood that the angle between arms 17 and 27 and the angle between arms 18 and 28 will decrease, the distance between pivot points 19 and 29 will decrease, and the distance between pivot points 43 and 45 will increase. In other words, the upper and lower corners 54B of the mechanism will move towards one another and the side or outer corners 54A of the mechanism will move apart, whereupon springs 15 will be stretched and, as the springs are stretched, the counterforce exerted by these springs will increase. Also, as the mechanism is compressed, this increase in force of the springs is offset by the increasing inclination of arms 27, 28 relative to the direction of pull of the springs so that the resultant output force F' of the mechanism remains substantially constant.

The converse of the above-described operation will take place if force F becomes less than force F', in which case the device will be urged towards an extended disposition with force F' remaining substantially constant.

Mechanism 11 was constructed having approximately the following dimensions and, by actual test, showed a substantially constant output over an operating range of the device between the positions shown in Figs. 2 and 4:

Length of each of arms 17, 18, 27, and 28 between its pivot points: 26 inches
Location of transverse piece 63: 20 3/16 inches above point 29
Location of the point of attachment of the outer end of the springs 15: On a line making an angle of 130 degrees with the main body of related lower arm 27 or 28 and 6 inches from the related point 43 or 45

If desired, one of the upper arms 17 or 18 and the related lower arm 27 or 28 attached thereto may be omitted to form a modified construction of the present invention as shown in Fig. 5. In this figure it will be seen arms 18 and 28 and the pair of springs 15 that were attached thereto have been omtited. The other part of the structure is the same as heretofore described with the exception of the spring supporting means. In place of pivoted post 31, a supporting means or post 69 is fixedly mounted from object B and lower arm 27 is pivotally mounted relative to object B from post 69, as at pivot point 71. It will be understood that a stationary post 69 is needed in the modified form rather than a pivoted post since there is not an opposing pair of springs 15 on the other side of the post to maintain the post in alignment between pivot points 19 and 71. The operation of the modified form shown in Fig. 5 is substantially the same as the operation of the other form heretofore described.

While the invention has been described with reference to certain details of construction as herein shown, it is not confined to the particular arrangement disclosed and this application is intended to cover such modifications or departures as may come within the purposes of the improvements or scope of the following claims.

We claim:

1. A mechanism, adapted to be mounted between a pair of objects, said mechanism comprising a first arm, a second arm pivotally interconnected adjacent one end with said first arm adjacent one end of the first arm to provide an articulated structure, said arms defining an angle therebetween, said arms being adapted to be respectively mounted from said pair of objects adjacent the other ends of the arms, rigid supporting means mounted from one of said objects and extending substantially towards said other object in spaced relationship thereto resilient means mounted adjacent one end on said supporting means in a fixed position thereon relative to said one of said objects and mounted adjacent the other end at an angle from one of said arms to urge said structure towards a straightened position for movement towards a compressed position by an outside force, said resilient means and said articulated structure being arranged with the relationship between the angle of the force of said resilient means relative to said one of said arms and the amount of the force of said resilient means being effective to produce a substantially constant resultant force against said outside force.

2. A mechanism comprising a first arm, a second arm pivotally interconnected adjacent one end with said first arm adjacent one end of the first arm to provide an articulated structure adapted to be mounted between a pair of objects, said arms defining an angle therebetween, rigid supporting means mounted from one of said objects and extending substantially towards said other object in spaced relationship thereto resilient means mounted adjacent one end on said supporting means in a fixed position thereon relative to said one of said objects and mounted adjacent the other end at an angle from one of said arms to urge said structure in a direction to change the angle between said arms for movement in the opposite direction by an outside force acting thereagainst, said resilient means and said articulated structure being arranged with the relationship between the angle of the force of said resilient means relative to said one of said arms and the amount of the force of said resilient means being effective to produce a substantially constant resultant force against said outside force.

3. A mechanism, adapted to be mounted between a pair of objects, said mechanism comprising four arms pivotally interconnected adjacent the opposite ends thereof to provide a four-sided diamond-like structure having four corners, an opposite pair of said corners being adapted to be respectively mounted from said pair of objects, rigid supporting means mounted from one of said objects and extending through and beyond the center of said diamond-like structure, a pair of resilient means respectively fixedly coupled adjacent one of the ends thereof to said supporting means and fixedly coupled adjacent the other end thereof to said diamond-like structure and arranged to urge the other pair of said corners towards one another, said resilient means depending at an angle from opposite sides of said supporting means towards said diamond-like structure, said diamond-like structure being compressible between said objects by an outside force acting thereon to stretch said resilient means and to incline increasingly said arms relative to said resilient means, said resilient means being characterized by an increase in counterforce exerted thereby when stretched, said increasing counterforce of said resilient means being offset by the increasing inclination of said arms as said diamond-like structure is compressed to provide a substantially constant resultant counterforce against said outside force.

4. A mechanism, adapted to be mounted between a pair of objects, said mechanism comprising a pair of arms respectively having inner and outer ends, one of said arms being adapted to be pivotally mounted adjacent the inner end thereof from one of said objects, the other of said arms being adapted to be pivotally mounted adjacent the inner end thereof from the other of said objects, said arms being pivotally joined adjacent the outer ends thereof at an angle, resilient means supported adjacent one end in fixed relationship with one of said objects and mounted adjacent the other end from one of said arms at an angle relative thereto for exerting a force on said one of said arms to urge said arms towards an extended position, said arms being movable against the force of said resilient means by an outside force to move said arms in a compressing direction in which the angle between said arms is decreasing, movement of said arms in a compressing direction being effective to incline increasingly said one of said arms relative to said resilient means and being effective to stretch said resilient means, said resilient means being characterized by an increase of counterforce exerted thereby when stretched, the increasing inclination of said one of said arms and the increasing counterforce of said resilient means when said arms are moved towards a compressing direction being arranged to offset one another and provide a substantially constant resultant counterforce against the applied outside force.

5. A mechanism, adapted to be mounted between a pair of objects, said mechanism comprising a first pair of arms and a second pair of arms, each of said arms in said first and second pairs having an inner and an outer end; the arms of said first pair being pivotally joined adjacent the inner ends thereof, the arms of said second pair being pivotally joined adjacent the inner ends thereof, one of the arms of said first pair being pivotally joined to one of the arms of said second pair adjacent the outer ends thereof, and the other of the arms of said first pair being pivotally joined to the other of the arms of said second pair adjacent the outer ends thereof to provide a four-sided diamond-like structure having an opposite inner pair of corners and an opposite outer pair of corners intermediate the inner pair of corners; said diamond-like structure being adapted to be pivotally mounted adjacent one of its inner pair of corners from one of said objects and adapted to be pivotally mounted adjacent the other of its inner pair of corners from the other of said objects; supporting means mounted from one of said objects adjacent one of said inner pair of corners and extending towards the middle of said diamond-like structure in spaced relationship to said other object, resilient means fixedly supported adjacent one end from said supporting means and mounted adjacent the opposite end from said diamond-like structure for urging said outer corners towards one another and said diamond-like structure towards an extended position, said diamond-like structure being compressible between said objects by an outside force acting thereon to stretch said resilient means and to incline increasingly said arms relative to said resilient means, said resilient means being characterized by an increase in counterforce exerted thereby when stretched, said increasing counterforce of said resilient means being offset by the increasing inclination of said arms as said diamond-like structure is compressed to provide a substantially constant resultant counterforce against said outside force.

6. A mechanism, adapted to be mounted between a pair of objects, said mechanism comprising a pair of arms respectively having inner and outer ends, one of said arms being adapted to be pivotally mounted adjacent the inner end thereof from one of said objects, the other of said arms being adapted to be pivotally mounted adjacent the inner end thereof from the other of said objects, said arms being pivotally joined adjacent the outer ends thereof at an angle, supporting means mounted from one of said objects adjacent the pivotal mounting of one of said arms therefrom and extending towards the pivotal mounting of the other of said arms from the other of said objects, the outer end of one of said arms projecting beyond the pivotal joint with the other of said arms to provide a rigid extension extending from the main body portion of its related arm, said extension extending outwardly at an angle relative to the main body portion of the arm, resilient means interposed between said supporting means and said extension for exerting a force on said extension to urge said arms towards an extended position, said resilient means being positioned at an angle relative to the main body portion of said one of said arms, said arms being movable against the force of said resilient means by an outside force to move said arms in a compressing direction in which the angle between said arms is decreasing, movement of said arms in a compressing direction being effective to incline increasingly said one of said arms relative to said resilient means and being effective to stretch said resilient means, said resilient means being characterized by an increase in counterforce exerted thereby when stretched, the increasing inclination of said one of said arms and the increasing counterforce of said resilient means when said arms are moved towards a compressing direction being arranged to offset one another and provide a substantially constant resultant counterforce against the applied outside force.

7. A mechanism, adapted to be mounted between a pair of objects, said mechanism comprising a first pair of arms and a second pair of arms, each of said arms in said first and second pairs having an inner and an outer end; the arms of said first pair being pivotally joined adjacent the inner ends thereof, the arms of said second pair being pivotally joined adjacent the inner ends thereof, one of the arms of said first pair being pivotally joined to one of the arms of said second pair adjacent the outer ends thereof, and the other of the arms of said first pair being pivotally joined to the other of the arms of said second pair adjacent the outer ends thereof to provide a four-sided diamond-like structure having an opposite inner pair of corners and an opposite outer pair of corners intermediate the inner pair of corners; said diamond-like structure being adapted to be pivotally mounted adjacent one of its inner pair of corners from one of said objects and adapted to be pivotally mounted adjacent the other of its inner pair of corners from the other of said objects; supporting means pivotally mounted from one of said objects adjacent one of said inner pair of corners and extending towards the middle of said diamond-like structure, the outer ends of said second pair of arms respectively projecting beyond the pivotal joints with said first pair of arms to provide rigid extensions extending from the main body portions of the second pair of arms, each of said extensions respectively extending outwardly at an angle relative to the main body portion of its related arm; a tension spring attached between said supporting means and one of said extensions and a second tension spring attached between said supporting means and the other of said extensions, said springs urging said outer corners towards one another and maintaining said supporting means in a position substantially in alignment between said inner corners, said diamond-like structure being compressible between said objects by an outside force acting thereon to move said outer corners outwardly away from one another against the increasing force of said springs being stretched and to incline increasingly said arms relative to the direction of the spring force, the increasing force of said springs being offset by the increasing inclination of said arms to provide a substantially constant resultant counterforce against said outside force.

References Cited in the file of this patent

UNITED STATES PATENTS

| | | |
|---|---|---|
| 1,665,897 | Standerwick | Apr. 10, 1928 |
| 1,893,295 | Le Bailly | Jan. 3, 1933 |
| 2,024,372 | Kromm et al. | Dec. 17, 1935 |
| 2,112,293 | Kromm et al. | Mar. 29, 1938 |